US011410701B2

(12) United States Patent
Denoue et al.

(10) Patent No.: US 11,410,701 B2
(45) Date of Patent: *Aug. 9, 2022

(54) SYSTEMS AND METHODS FOR DIRECT VIDEO RETOUCHING FOR TEXT, STROKES AND IMAGES

(71) Applicant: FUJIFILM Business Innovation Corp., Tokyo (JP)

(72) Inventors: Laurent Denoue, Verona (IT); Scott Carter, Mountain View, CA (US); Matthew L. Cooper, San Francisco, CA (US); Vikash Rugoobur, San Jose, CA (US)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 77 days.

This patent is subject to a terminal disclaimer.

(21) Appl. No.: 16/938,556

(22) Filed: Jul. 24, 2020

(65) Prior Publication Data

US 2020/0357442 A1 Nov. 12, 2020

Related U.S. Application Data

(63) Continuation of application No. 14/297,651, filed on Jun. 6, 2014, now Pat. No. 10,755,744.

(51) Int. Cl.
*G11B 27/031* (2006.01)
*G06F 16/958* (2019.01)
*G06T 11/60* (2006.01)

(52) U.S. Cl.
CPC .......... *G11B 27/031* (2013.01); *G06F 16/986* (2019.01); *G06T 11/60* (2013.01)

(58) Field of Classification Search
CPC . G11B 27/031; G11B 27/034; G11B 2220/90; G11B 27/105; G06F 16/986; G06T 11/60; H04N 9/8042

(Continued)

(56) References Cited

U.S. PATENT DOCUMENTS 5,247,355 A 9/1993 Frederiksen
5,778,404 A 7/1998 Capps et al.
(Continued)

FOREIGN PATENT DOCUMENTS

WO 2010067350 A1 6/2010

OTHER PUBLICATIONS

Breuel, T.M., et al., Paper to PDA, Xerox PARC TR-01-2002 http://www.parc.com/content/attachments/janssen-TR-01-2.pdf.

(Continued)

*Primary Examiner* — Thai Q Tran
*Assistant Examiner* — Nienru Yang
(74) *Attorney, Agent, or Firm* — Procopio, Cory, Hargreaves & Savitch LLP

(57) ABSTRACT

A computer-implemented method performed in connection with a video comprising a plurality of video frames, the computer-implemented method being performed in a computerized system comprising a processing unit and a memory, the computer-implemented method involving: using the processing unit to detect a plurality of content components within at least one of the plurality of video frames; based on a video modification instruction received from a user, modifying at least one of the plurality of the detected content components; storing an information on the modified at least one of the plurality of the detected content components in the memory; using the central processing unit to overlay the modified at least one of the plurality of the detected content components over the video; and causing the video with the overlaid modified content component to be displayed to the user.

25 Claims, 7 Drawing Sheets

(58) Field of Classification Search
USPC .......................................................... 386/278
See application file for complete search history.

(56) References Cited

U.S. PATENT DOCUMENTS

| | | | |
|---|---|---|---|
| 6,937,766 B1 | 8/2005 | Wilf et al. | |
| 6,968,085 B2 | 11/2005 | Bern et al. | |
| 8,549,556 B2* | 10/2013 | Rakib | G06K 9/00758 725/34 |
| 2006/0274948 A1 | 12/2006 | Wamg et al. | |
| 2010/0202750 A1* | 8/2010 | Senftner | G11B 27/034 386/278 |
| 2011/0128830 A1 | 6/2011 | Namiki et al. | |
| 2011/0321082 A1* | 12/2011 | Weerasinghe | H04N 5/445 725/31 |
| 2013/0177295 A1 | 7/2013 | Cath | |
| 2014/0143806 A1 | 5/2014 | Steinberg et al. | |
| 2014/0192140 A1 | 7/2014 | Peevers et al. | |
| 2014/0232813 A1 | 8/2014 | Lai et al. | |
| 2014/0245152 A1 | 8/2014 | Carter et al. | |
| 2015/0172563 A1 | 6/2015 | Jakobson et al. | |

OTHER PUBLICATIONS

Chen, F., et al., SmartDCap: Semi-Automatic Capture of Higher Quality Document Images from a Smartphone, IUI 2013, Mar. 19, 2013.
Denoue, L., et al., Real-Time Direct Manipulation of Screen-Based Videos, IUI 2013, Mar. 19, 2013.
Khoubyari, S., et al., Font and Function Word Identification in Document Recognition, Computer Vision and Image Understanding, vol. 63(1), Jan. 1996, pp. 66-74.
Bagley, S.C., et al., Editing Images of Text, Communications of the ACM 37, No. 12, 1994, pp. 63-72.
Golovchinsky, G., et al., Moving Markp: Repositioning Freeform Annotations, Prooceedings of ACM UIS 2002, Oct. 27, 2002.
Mei, A., et al., VideoSense: Towards Effective Online Video Advertising, Proc. ACM Multimedia 2007, 2007, pp. 1075-1084.
Saund, E., et al., Perceptually-Supported Image Editing of Text and Graphics, UIST 2003.

* cited by examiner

| Time | Original video | Edited video | Comments |
|---|---|---|---|
| 0 | `def sin(int x)` | `def sin(float x)` | 2-System applied edits backwards because same line |
| 10 | `def sin(int x)` | `def sin(float x)` | 1-User edited |
| 20 | `def asin(int x)`<br>`----I-----------` | `def asin(float x)` | 3-System shifts user's edits |
| 30 | `def asin(int x, int y)`<br>`----I--------AAAAAAA--` | `def asin(float x, int y)` | 4-System shifts user's edits and appends new content |
| 40 | `def asin(double x)` | `??????????????????????` | 5-Conflict |

Figure 5

SYSTEMS AND METHODS FOR DIRECT VIDEO RETOUCHING FOR TEXT, STROKES AND IMAGES

CROSS-REFERENCE TO RELATED APPLICATIONS

This application is a Continuation application of U.S. application Ser. No. 14/297,651, filed on Jun. 6, 2014, the content of which is incorporated herein by reference.

BACKGROUND OF THE INVENTION

Technical Field

The disclosed embodiments relate in general to systems and methods for handling video content and, more specifically, to systems and methods for direct video retouching for text, strokes and images.

Description of the Related Art

Millions of video tutorials are available online for students and the general public. Many of them, such as tutorials in computer programming, contain video of a text being progressively typed. Many other videos contain textual presentation materials, such as presentation slides being discussed by a presenter. Finally, some videos show freeform strokes, such as when a person draws mathematical formulas. Exemplary embodiments of such video content include Khan Academy tutorial videos freely available online and well known to persons of ordinary skill in the art.

Unfortunately, modifying these videos, which may involve adding textual content or freeform strokes, correcting typos or beautifying graphics is a very time-intensive task. For example, in accordance with the conventional technology, a video of a presentation needs to be manually retouched in order to correct a simple typographical error in the shown presentation material.

Accordingly, the conventional systems and methods for retouching videos for text, freeform strokes and graphics are inconvenient and time consuming. Therefore, new and improved systems and methods are needed that would enable users to easily retouch videos.

SUMMARY OF THE INVENTION

The embodiments described herein are directed to systems and methods that substantially obviate one or more of the above and other problems associated with the conventional technology for retouching videos.

In accordance with one aspect of the embodiments described herein, there is provided a computer-implemented method performed in connection with a video having a plurality of video frames, the computer-implemented method being performed in a computerized system incorporating a processing unit and a memory, the computer-implemented method involving: using the processing unit to detect a plurality of content components within at least one of the plurality of video frames; based on a video modification instruction received from a user, modifying at least one of the plurality of the detected content components; storing an information on the modified at least one of the plurality of the detected content components in the memory; using the central processing unit to overlay the modified at least one of the plurality of the detected content components over the video; and causing the video with the overlaid modified content component to be displayed to the user.

In one or more embodiments, modifying at least one of the plurality of the detected content components involves adding a content to the at least one of the plurality of the detected content components.

In one or more embodiments, the method further involves automatically determining a style of the at least one of the plurality of the detected content components and matching a style of the added content to the determined style.

In one or more embodiments, the information on the modified at least one of the plurality of the detected content components comprises the added content and a corresponding content insertion time.

In one or more embodiments, the modified at least one of the plurality of the detected content components comprises a line of textual content.

In one or more embodiments, the modified at least one of the plurality of the detected content components comprises an ink stroke.

In one or more embodiments, the modified at least one of the plurality of the detected content components comprises an image.

In one or more embodiments, the method further involves determining whether the at least one of the plurality of the detected content components changes in the video.

In one or more embodiments, the method further involves propagating the modification of the at least one of the plurality of the detected content components to all the video frames within the video if it is determined that the at least one of the plurality of the detected content components does not change in the video.

In one or more embodiments, the method further involves propagating the modification of the at least one of the plurality of the detected content components to other video frames within the video until the at least one of the plurality of the detected content components changes in the video.

In one or more embodiments, the method further involves generating a warning message to the user if it is determined that the at least one of the plurality of the detected content components changes in the video.

In one or more embodiments, the method further involves merging the modification of the at least one of the plurality of the detected content components with the changed at least one of the plurality of the detected content components.

In one or more embodiments, the method further involves marking each of the plurality of the detected content components within the video with a corresponding bounding box.

In one or more embodiments, the method further involves pausing the video upon receipt of the video modification instruction from the user.

In one or more embodiments, the information on the modified at least one of the plurality of the detected content components is stored in a video edit layer associated with the video.

In one or more embodiments, the modified content component is displayed to the user based on a temporal nature of the video.

In one or more embodiments, the method further involves enabling the user to copy portions of the plurality of the detected content components and paste the copies portions to create the modified content component.

In one or more embodiments, the method further involves generating an overview image of the video, the overview image indicating to the user portions of the video where the modification can be made without an interference with any of the plurality of content components within the video.

In one or more embodiments, the method further involves detecting a horizontal shift of the content component within the video by performing an image difference operation on the content component in at least two different video frames.

In one or more embodiments, the method further involves detecting a vertical shift of the video frame by performing an image difference operation on at least two different video frames.

In one or more embodiments, the video modification instruction comprises a selection of one of the plurality of content components by the user.

In one or more embodiments, the method further involves preventing the user from making the modification to the content component if it is determined that the modification to the content component would interfere with other content component of the plurality of content components in a different frame of the video.

In accordance with another aspect of the embodiments described herein, there is provided a non-transitory computer-readable medium embodying a set of computer-executable instructions, which, when executed in connection with a video including a plurality of video frames in a computerized system incorporating a processing unit an a memory, causes the computerized system to perform a method involving: using the processing unit to detect a plurality of content components within at least one of the plurality of video frames; based on a video modification instruction received from a user, modifying at least one of the plurality of the detected content components; storing an information on the modified at least one of the plurality of the detected content components in the memory; using the central processing unit to overlay the modified at least one of the plurality of the detected content components over the video; and causing the video with the overlaid modified content component to be displayed to the user.

In accordance with yet another aspect of the embodiments described herein, there is provided a computerized system incorporating a processing unit and a memory storing a set of instructions, the set of instructions including instructions for: using the processing unit to detect a plurality of content components within at least one of a plurality of video frames of a video; based on a video modification instruction received from a user, modifying at least one of the plurality of the detected content components; storing an information on the modified at least one of the plurality of the detected content components in the memory; using the central processing unit to overlay the modified at least one of the plurality of the detected content components over the video; and causing the video with the overlaid modified content component to be displayed to the user.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIGS. 1 (a) and 1 (b) illustrate an exemplary use of an embodiment of the described system to easily insert a new typed word into a video.

FIG. 5 illustrates the manner of conflict resolution performed by an embodiment of the described system in connection with certain conflicts arising during video manipulation by the user.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with one aspect of the embodiments described herein, there is provided a computerized system and computer-implemented method for retouching videos, which may involve adding textual content or freeform strokes, correcting typos and/or beautifying graphics.

Figures 1A, 1B:
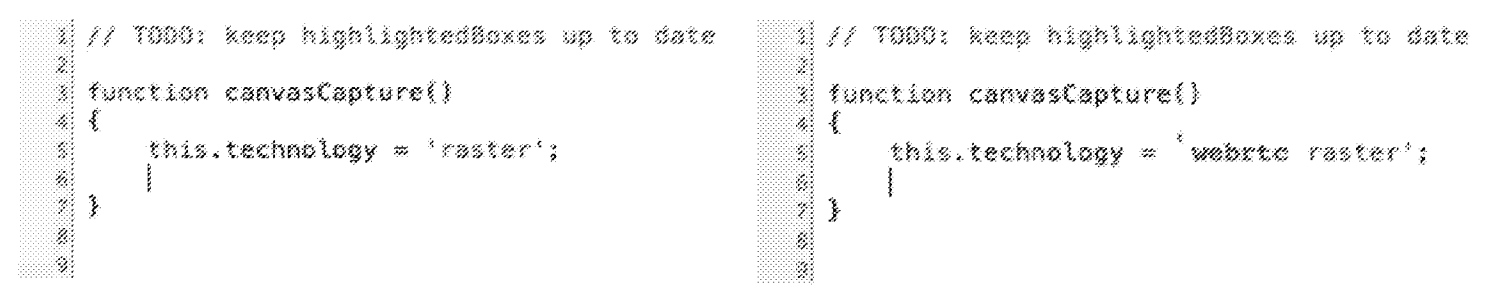

FIGS. 1 (a) and 1 (b) illustrate an exemplary use of an embodiment of the described system to easily insert a new typed word "webrtc" into a video. To perform the foresaid insertion, the user clicks his mouse between the quote (') and the word "raster", and starts typing webrtc. An embodiment of the described system automatically recognizes text bounding boxes using content components on the right of the click and starts shifting the video frame content to the right to accommodate the new characters. The embodiment of the system is also configured to detect the font style, color, blur and to draw the inserted textual characters accordingly so that they looks similar to surrounding text. Specifically, FIG. 1 (a) illustrates the video with textual content before the modification. In the shown video, the user wishes to insert word 'webrtc' before the word 'raster'. FIG. 1 (*b*) illustrates the content insertion process: an embodiment of the described system pushes the word 'raster' to the right and draws the textual characters input by the user using a similar font style and color to the existing characters.

Figure 2B:
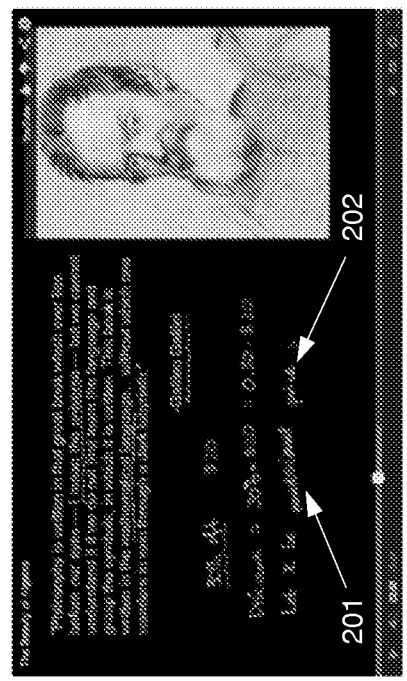
FIGS. 2(a) and 2(b) illustrate a real use-case where a teacher can retouch a video by adding a hand-written word.
Figure 2A:
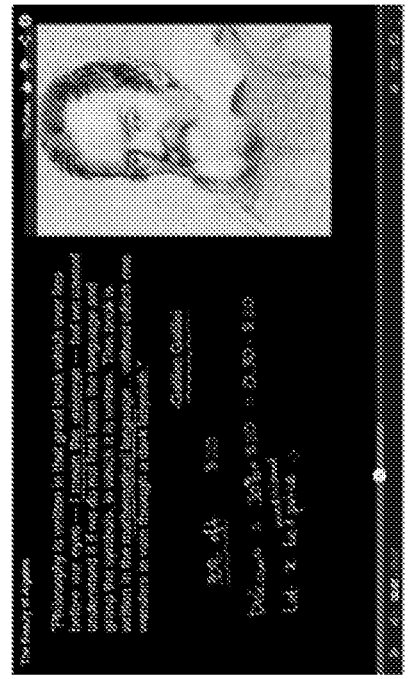

It should be also noted that in addition to the videos containing textual content, there is also a large number of videos with freeform ink strokes. Such videos include the aforesaid Khan Academy tutorial videos. FIGS. 2(*a*) and 2(*b*) illustrate a real use-case where a teacher can retouch such a video by adding a hand-written word "non discount" between words "be" and "price". As shown in FIG. 2(*a*), when creating a video, the teacher forgot to write a term "non discount" between words "be" and "price." On the other hand, as shown in FIG. 2(*b*), using an embodiment of the described system, the user can select the original strokes 201 and insert them at the right place, while the system shifts the content 202 to the right.

Figure 3:
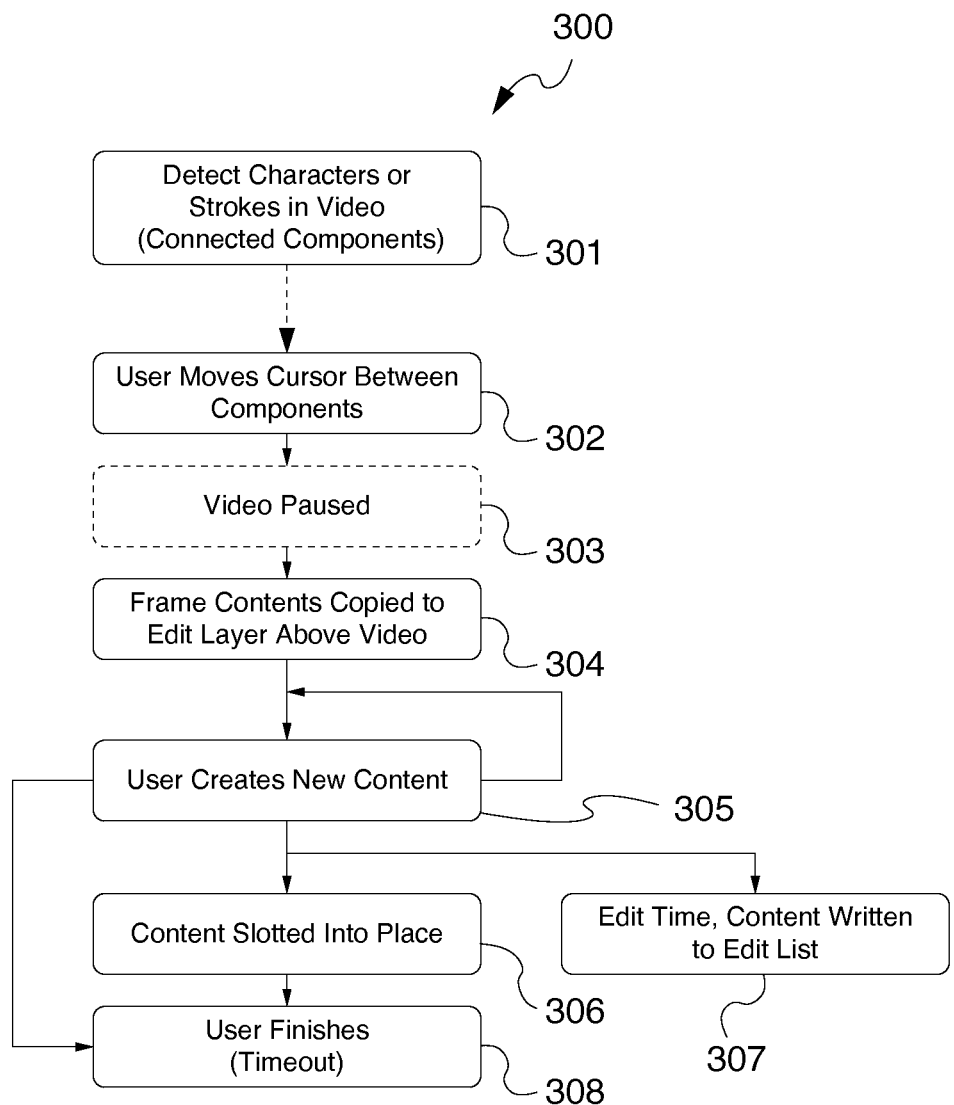
FIG. 3 illustrates an exemplary operating sequence of an embodiment of a system for processing video frames and direct video manipulation enabling the user to edit the original video content, including, without limitation, text, freedom ink strokes and images.

FIG. 3 illustrates an exemplary operating sequence 300 of an embodiment of a system for processing video frames and direct video manipulation enabling the user to edit the original video content, including, without limitation, text, freedom ink strokes and images. First, at step 301, the system detects content components in the frames of the video, such as alphanumeric characters or freedom ink strokes using content segmentation techniques well known to persons of ordinary skill in the art. In one or more embodiments, the detected content components may be referred to as connected content components in a sense that all the content elements included within each such component would have either spatial or temporal association. In one example, the connected component may be a group of pixels or other graphical primitives that touch each other or located close to one another. In one or more embodiments, the connected component may be enclosed in a bounding box, wherein the bounding box is usually a rectangular box that encloses all pixels or other elements of that component. However, bounding boxes of other shapes (e.g. round, oval etc.) may also be used to enclose the connected components. In one or more embodiments, the detected content components may be indicated to the user using, for example, the corresponding bounding boxes. At step 302, the system enables the user to move cursor between the detected content components and select the appropriate component by clicking at the corresponding location with a mouse or other pointing device. In one embodiment, upon detection of user's moving the cursor between the detected content components, the system is configured to pause the video, see step 303. In another embodiment, the system may be configured to continue playing video, but visually pause the video for the user, unless certain new information (e.g. new content added on the same line) is available.

At step 304, the previously detected video frame contents, including all content components, such as textual content, freedom ink strokes and images are copied to a video edit layer and associated with the video. At step 305, the user creates new content, such as additional textual content, additional freedom ink strokes or additional graphical content to be added to the video. At step 306, the new content is slotted into an appropriate place within the video edit layer together with the corresponding content insertion time(s). At step 307, the system may change the content edit time and the content is written to the video edit layer with the adjusted insertion time. At step 308, the video content editing operation finishes, which may occur upon a predetermined timeout in the detected actions of the user.

After the video has been retouched by the user in the manner described above, the modified video incorporating user's new content can be replayed back to the user. In one embodiment, during or prior to the replaying step, the system creates (renders) an entirely new video that integrates the user's edits. Such rendering may be performed off-line on a frame-by-frame basis, wherein the new content added to each frame is merged with the original video frame and a new video frame is rendered and stored.

Figure 4:
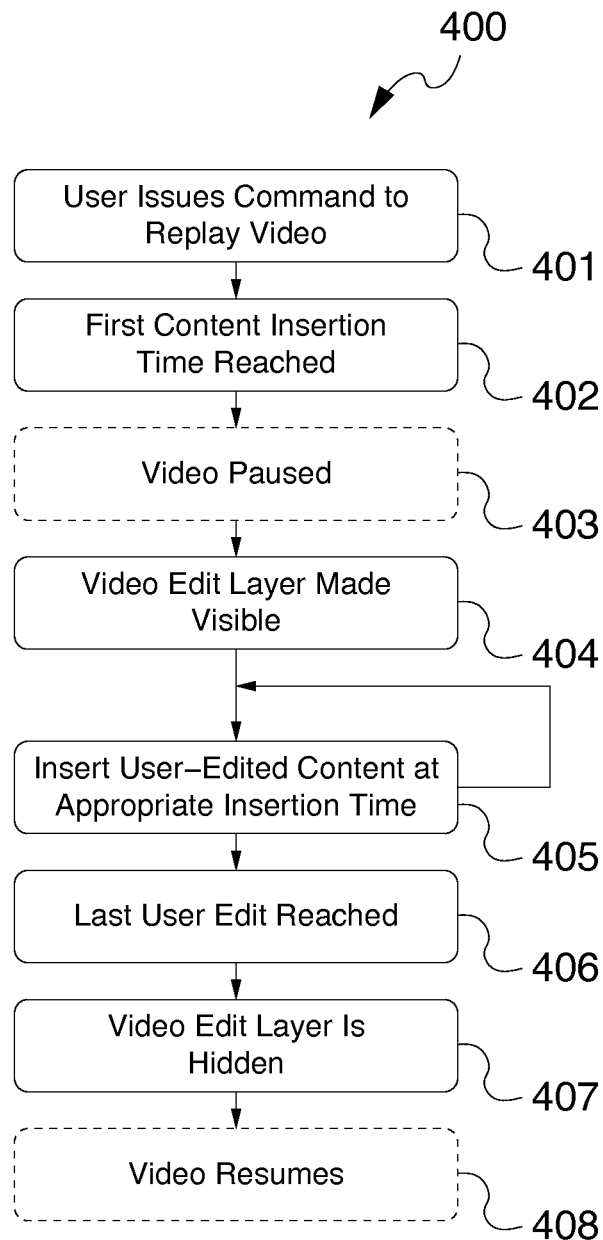
FIG. 4 illustrates an exemplary operating sequence of an embodiment of a system for playing the final video incorporating the user's edits.

In another, alternative embodiment, the user's changes are kept in a separate layer and dynamically integrated into the video during the playback. The advantage of the latter layer-based method is that the system could potentially adjust (e.g. turn On or OFF) the visibility of the layer containing the new content added by the user enabling the user to effectively "undo" the user's changes. FIG. 4 illustrates an exemplary operating sequence 400 of an embodiment of a system for playing the final video incorporating the user's edits. At step 401, the system receives a command from the user to play the edited video. At step 402, the system reaches the insertion time of the first new content added by the user. To this end, the system reads the contents of the video edit layer, which includes the actual added content as well as the corresponding insertion times.

In one embodiment, upon reaching the first insertion time, the system is configured to pause the video that is being played, see step 403. In another embodiment, video continues to be played by the system so that the associated audio stream continues to play normally. However, the original video frames are appropriately hidden until the edited video frames finished playing.

At step 404, the system is configured to make the video edit layer visible to the user. At step 405, the user-added content read from the video edit layer is inserted into the original video frames at the appropriate insertion time and the resulting video frame is shown to the user. The step 405 is then repeated for the additional added content, if any. At step 406, the last added content is read and inserted into the video. At step 407, the video edit layer is hidden from the user and the system resumes playing the original (unmodified) video at step 408.

In one or more embodiments, the system automatically detects the content style of each previously discovered content component in the video and matches the style of the corresponding user-inserted content to the original content style found in the video. To this end, at the aforesaid step 301 of the operating sequence 300, after the system detects the last content component in the video frame, the system proceeds to detect the background color, which may be used for the inserted content matching as described below. In one embodiment, after the user clicks, at step 302, at a location with coordinates x, y over the video canvas (frame), the system automatically finds the corresponding line of text using, for example, the aforesaid bounding boxes of the content components. In one or more embodiments, the height of the found line of text is used to determine the font height in pixels of the new text added by the user to that line.

In one or more embodiments, the font color for the newly added text can be specified by the user, or determined by the system automatically by looking at the content components and choosing the dominant color in the content components of the corresponding text line without giving regard to the previously determined background color. In one embodiment, the font style for the new characters is predetermined. In alternative embodiments, the font style is specified by the user or automatically inferred by the system using any font identification methods known in the art, such as a technique described in Font and Function Word Identification in Document Recognition, Siamak Khoubyari, Jonathan J. Hull, Computer Vision And Image Understanding, Vol. 63, No. 1, January, pp. 66-74, 1996. In one or more embodiments, the described system enables the user to copy and paste items as editing bits and does not limit the user to typing new characters or drawing new ink strokes.

In one or more embodiments, the newly inserted content is shown taking into account the temporal nature of the original video content. To this end, the system compares successive video frames and uses a frame difference operation to determine if the frame content is changing in time. The system uses the frame difference operation to determine whether user's edits are still valid, such as whether the overlays need to be repositioned, disappear or stay in place. Using this difference operation, the system distinguishes between static and dynamic video frames. Regardless of the aforesaid frame type (static or dynamic), when the user clicks at a location with coordinates x and y over the video frame, the system finds the corresponding line using content components in the manner described above.

In one or more embodiments, after the line is found, the line is then segmented into units of "bitmapped characters". A cursor shows the user the current insertion point of the new content. In one embodiment, an overlay is created over the edited line with a copy of that line. Whenever the user adds or removes characters, the overlay bitmap is modified accordingly. For example, when the user adds a character at the cursor location, the system automatically removes the character before the cursor position if the BACKSPACE keyboard key pressed, or after the cursor position if the DELETE keyboard key is pressed. In one or more embodiments, as soon as the user makes one edit in a specific line, the system looks for changes in the original video for that line. As long as the line does not change in the original video, user's edits are simply overlaid—all the content added by the user is shown in the modified video.

On the other hand, if the aforesaid line does change in the original video, e.g. the original video adds a character somewhere in the line, then the system can be configured to perform the following actions:

a) Warn the user that his edits are no longer valid; or b) Try to merge user's edits with the new line content from the original video.

In one or more embodiments, the aforesaid actions a) and b) can be triggered by the system automatically based on the confidence of resolving the described conflict correctly. In an alternative embodiment, the default choice between actions a) and b) can be specified to the system as a parameter, that causes the system operate, by default, one way or the other. When the above action a) is triggered, the system warns the user and makes user's edits disappear when the corresponding line changes in the original video. However, the user's edits will be displayed during the time when the line remains unchanged. On the other hand, when action b) is triggered, the system merges the user's changes and the line changes in the original video content, similar to the source code merges illustrated in FIG. 5.

Figure 6:
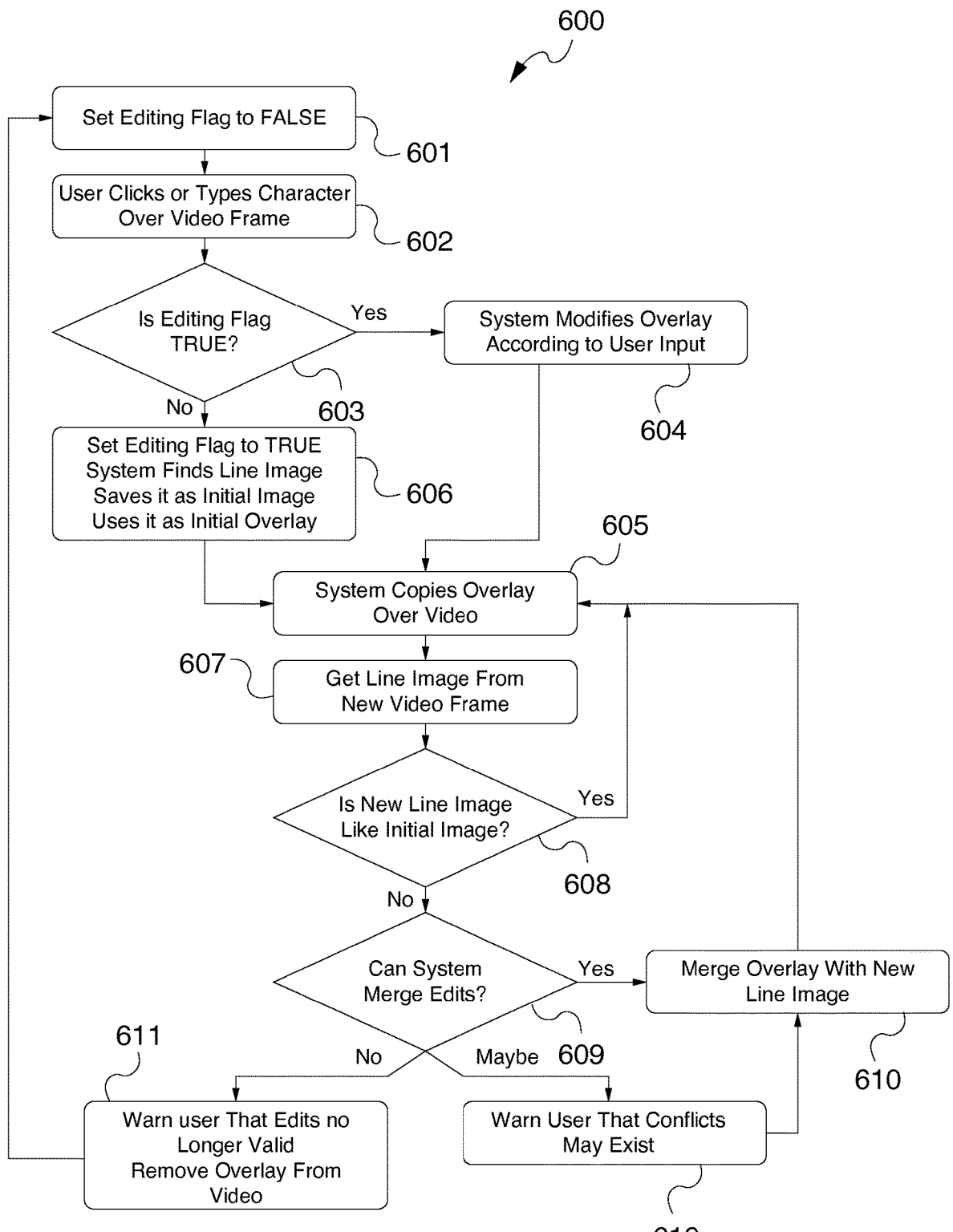
FIG. 6 illustrates an exemplary operating sequence showing the manner in which an embodiment of the described system listens for user's input, overlays user's edits and detects changes in video frames.

As illustrated in FIG. 6, when the user clicks on the video frame, the system identifies the corresponding line image, saves a copy of the identified line image and uses this copy as an overlay. Thereafter, the user proceeds to edit the selected frame, while the original video continues to play in the background, allowing the system to look at the difference between upcoming video frames and the saved information. In order to enable the system to handle the aforesaid action a) above, the system is configured to compute a (thresholded) bitmap difference between the aforesaid two lines (the saved line and the corresponding line in the upcoming video frames).

On the other hand, for the action b) above, the system is configured to break down the line image into content components and then perform the difference operation on these content components. It should be noted that this second method can also be used in connection with the action a) above, but is not necessary as the simple frame difference operation is sufficient to detect whether or not there has been a change between the aforesaid two line images.

First, the handling of static video frames by an embodiment of the described system will be considered. The static case is where the video frames are very similar, for example when a slide is shown during a video lecture. During such a video lecture, even if motion of lecturer's face is present in parts of video frames, there are portions of the video frames (e.g. the slide) that remain still. In that case, an embodiment of the described system relies on the aforesaid detected content components to find lines of text. When the user types in new characters, the system replaces the existing character bounding boxes with the new characters, or deletes them by drawing over a rectangle matching the background color. If the user clicks in the middle of a text line, the aforesaid character insertions shift existing content to the right.

In one or more embodiments, the newly inserted characters are drawn with a background color automatically determined by the system by checking the background color at the right-most location on the same line of text. In alternative embodiments, other background color determination strategies are used, such as by determining the color of the background while disregarding (subtracting) the content components. As would be appreciated by persons of ordinary skill in the art, this would allow the newly added text to visually blend when the background color is not uniform, as it is the case in slide with background color gradients.

In one or more embodiments, if the same original content as being currently edited by the user is shown later in the video, such as when the same slide is shown twice at two different times, the system so informs the user and automatically reapplies the user's edits to the later content. In one embodiment, while the system automatically re-applies the edits to the future identical content, the system is configured to show the user where the changes have been re-applied using, for example, a video timeline, allowing the user the opportunity to double-check the automatically re-applied changes.

As would be appreciated by persons of ordinary skill in the art, free ink stroke-based videos including the aforesaid Khan Academy tutorial videos well known to person of ordinary skill in the art are also mostly static. Usually, while the original video shows free ink strokes being added, once added, the ink strokes don't change. When the screen is full, the original video typically clears out the canvas and starts showing new ink strokes. If the screen clears, the overlays also disappear because the content they were tied to is no longer shown.

As would be appreciated by persons of ordinary skill in the art, a problem arises if the user inks over an area that will contain ink strokes later in the same video. In that case, in one embodiment, the described system is configured to perform any of the following actions:

1. Prevent the user from inking over this area and, if necessary, generate and display an appropriate error message to the user;

2. Show the user where on the canvas it is safe to ink, which may include areas that remain blank in the future until the screen clears up again. In one embodiment, the system may be configured to show the user an overview image of the video in the manner described, for example in U.S. patent application Ser. No. 13/775,116. This overview image may indicate to the user areas on the canvas where the user can ink, visually showing future frames where interfering content will be present. In one or more embodiments, this could be accomplished using semi-transparent shadows; or 3. Inform the user that user's edits will disappear once the new content starts overlapping the newly added ink strokes.

Now, the handling of dynamic video frames by an embodiment of the described system will be explained. For the dynamic content case, for example a video showing a person typing in a text editor, the system relies on frame differences to determine where text content is being added in the original video. When the user clicks at the end of a line and deletes characters, the newly inserted characters replace the original characters in the video. Unlike the static case, video playback overlays the inserted characters starting at the frame when the corresponding character was first added in the original video. That point in time is found by means of detecting the frame differences.

The handling by an embodiment of the described system of vertical shift operations of the content in the video will now be described. As would be appreciated by persons of ordinary skill in the art, when in the video the user edits a line of text, it is possible that the original video frame shifts vertically at a later time. Overlays showing the edits need also to shift to follow the original content. In one or more embodiments, the system uses a scroll detector described in Laurent Denoue, Scott Carter, Matthew Cooper, and John Adcock, Real-time Direct Manipulation of Screen-based Videos, IUI 2013, Mar. 19, 2013, to determine the direction of the global shift between two video frames. The latter method is appropriately applied when the original video shifts globally, such as when the user in the original video scrolls up a text editor.

In one or more embodiments, the latter scroll detection technique is extended to find sub-region shifts. Specifically, if the original video shows new lines added, the top part of the frame above the new lines is unchanged but the bottom part is shifted down. Similarly, if the user in the original video deletes lines of text, content below the deleted portions will shift up in subsequent frames. In both cases, the overlays need to keep in sync as the content shifts.

In one or more embodiments, the shift detector uses a frame difference to detect the changed region. With the difference, the system computes the vertical and horizontal projection profiles and finds the region that has changed. The vertical scroll value is only computed on this region and all overlays shown in that region are shifted accordingly.

The handling by an embodiment of the described system of horizontal shift operations of the content in the video will now be described. Such shifts are important to detect when user edits are still valid at later times in the video. In one embodiment, the system detects changes in a given line of text by finding a different between the two lines involved. Similarly to a text-based difference operation, the image difference operation tells the system:

1. If the line has changed; and
2. How the line has changed, including insertions, deletions and substitutions.

FIG. 5 illustrates the manner of conflict resolution performed by an embodiment of the described system in connection with certain conflicts arising during video manipulation by the user. For example, FIG. 5 indicates that the original video at time 0 contains line of text def sin(int x). At time 10, the user edits this line to become def sin(float x). Because the content from time=0 to time=10 has not changed in the original video, in one embodiment, the edits applied by the user at time 10 will start showing at time=0 when the video is played back with the edits. However, at time 20, the original video now shows def asin(int x). Therefore, the described difference detection algorithm detects that something was changed in the original video, see the detected difference indication right below the text line. In one embodiment, the system is configured to warn the user that the user's edits will need to disappear. In response to the aforesaid warning, the user can choose to re-apply the edits manually (possibly using copy and paste to make it faster). In another embodiment, the system automatically re-applies the user's edit by shifting it by the same amount that was inserted.

At time 30, the original video is further modified with the affected line of text now reading def asin(int x, int y), see FIG. 5. This change also triggers a difference detection as shown (below the text line) in FIG. 5 and the system can automatically apply user's edits to paint def asin(float x, int y).

Unlike an unambiguous text-based difference operation, this algorithm works on noisy video frames to compute differences of lines in video frames. In one embodiment, the system will always warn users when a line has changed, and assist the user to know where she should re-apply her edits. At time 40, for example, the original video changes text "int x" into text "double x". It is up to the user to decide if her edits should be re-applied. As would be appreciated by persons of ordinary skill in the art, the described conflict resolution is similar to dealing with merge conflicts in code versioning systems.

FIG. 6 illustrates an exemplary operating sequence 600 showing the manner in which an embodiment of the described system listens for user's input, overlays user's edits and detects changes in video frames. At step 601, the system sets the value of an editing flag to FALSE. At step 602, the system detects the user clicking or typing a character over a video frame. At step 603, the system checks whether the value of the editing flag is TRUE. If so, at step 604, the system is configured to modify the overlay in accordance with the user input. Subsequently, at step 605, the system copies the overlay over the video. On the other hand, if the value of the editing flag is FALSE, the operation proceeds to step 606. In this step, the system sets the value of an editing flag to TRUE, finds a line image, saves it as an initial image and uses it as an initial overlay. After that, the operation proceeds to the aforesaid step 605. At step 607, the system obtains a line image from a new video frame. At step 608, the new line image is compared with the initial line image. If the aforesaid two images are similar, the operation proceeds back to step 605. On the other hand, if at step 608 the image differences have been found, the operation proceeds to step 609, wherein it is determined whether the user edits could be merged. If so, at step 610 the overlay is merged with the new line image and the operation returns to the aforesaid step 605. If the edits could not be merged, the operation proceeds to step 611, whereupon the system issues a warning to the user that user's edits are no longer valid and the overlay is removed from the video and the operation subsequently returns to step 601. Finally, if the system is able to merge the user's edits subject to the resolution of some unlikely conflicts, at step 612, the system issues a warning to the user that such conflicts may exist, whereupon the operation returns to step 610.

Figure 7:
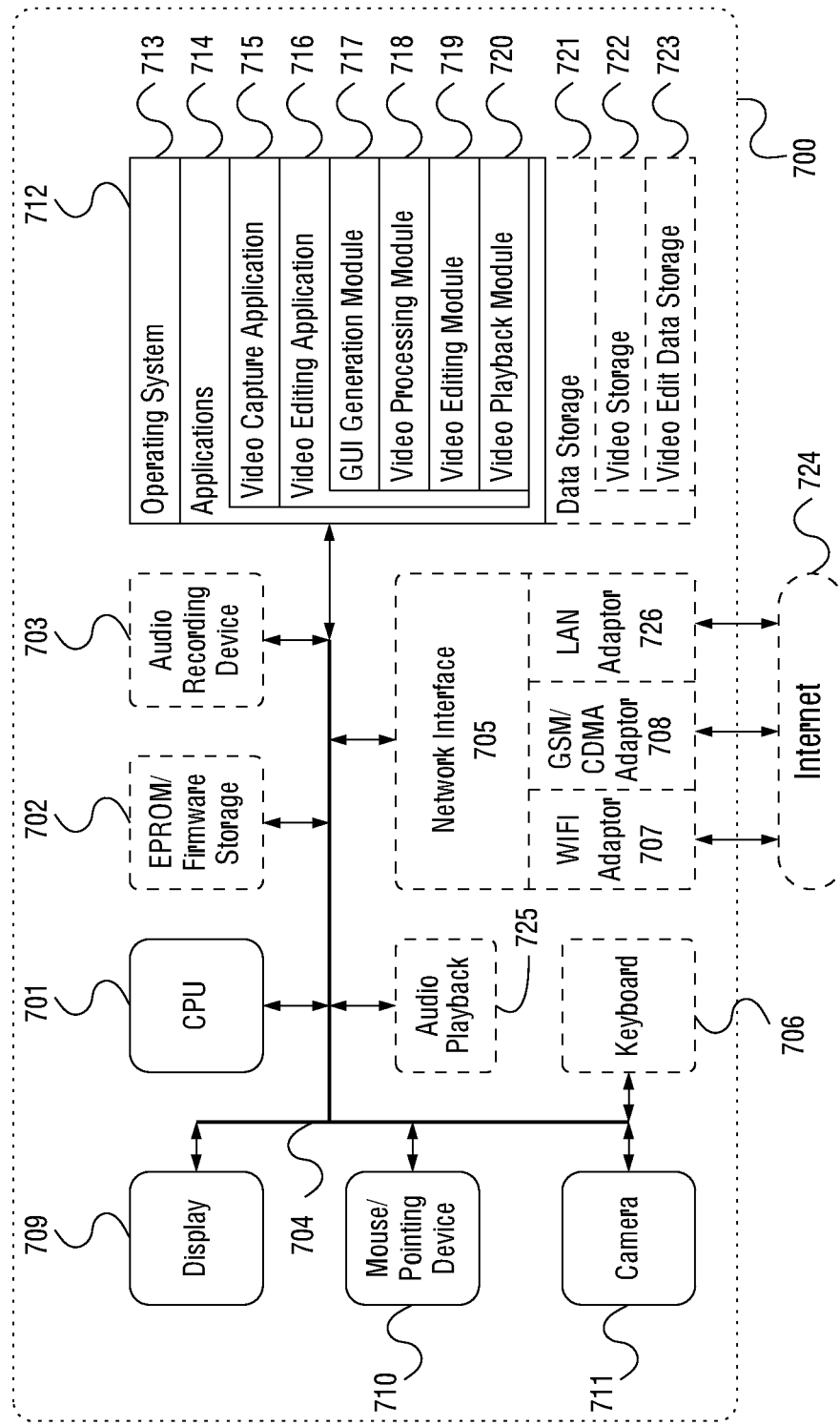
FIG. 7 illustrates an exemplary embodiment of a computerized system for direct video retouching for text, strokes and images on which one or more of the embodiments described herein may be deployed.

FIG. 7 illustrates an exemplary embodiment of a computerized system 700 for direct video retouching for text, strokes and images on which one or more of the embodiments described herein may be deployed. In one or more embodiments, the computerized system 700 may be implemented within the form factor of a desktop computer or a server well known to persons of skill in the art. In an alternative embodiment, the computerized system 700 may be implemented based on a laptop computer, a notebook computer, a tablet computer, a smartphone or other mobile computing device.

The computerized system 700 may include a data bus 704 or other interconnect or communication mechanism for communicating information across and among various hardware components of the computerized system 700, and a central processing unit (CPU or simply processor) 701 electrically coupled with the data bus 704 for processing information and performing other computational and control tasks. Computerized system 700 also includes a memory 712, such as a random access memory (RAM) or other dynamic storage device, coupled to the data bus 704 for storing various information as well as instructions to be executed by the processor 701. The memory 712 may also include persistent storage devices, such as a magnetic disk, optical disk, solid-state flash memory device or other non-volatile solid-state storage devices.

In one or more embodiments, the memory 712 may also be used for storing temporary variables or other intermediate information during execution of instructions by the processor 701. Optionally, computerized system 700 may further include a read only memory (ROM or EPROM) 702 or other static storage device coupled to the data bus 704 for storing static information and instructions for the processor 701, such as firmware necessary for the operation of the computerized system 700, basic input-output system (BIOS), as well as various configuration parameters of the computerized system 700.

In one or more embodiments, the computerized system 700 may incorporate a display device 709, which may be also electrically coupled to the data bus 704, for displaying various information to a user of the computerized system 700, such as a user interface for editing the video described above. In an alternative embodiment, the display device 709 may be associated with a graphics controller and/or graphics processor (not shown). The display device 709 may be implemented as a liquid crystal display (LCD), manufactured, for example, using a thin-film transistor (TFT) technology or an organic light emitting diode (OLEO) technology, both of which are well known to persons of ordinary skill in the art. In various embodiments, the display device 709 may be incorporated into the same general enclosure with the remaining components of the computerized system 700. In an alternative embodiment, the display device 709 may be positioned outside of such enclosure, such as on the surface of a table or a desk.

In one or more embodiments, the computerized system 700 may further incorporate an audio playback device 725 electrically connected to the data bus 704 and configured to play various audio files, such as MPEG-3 files, or audio tracks of various video files, such as MPEG-4 files, well known to persons of ordinary skill in the art. To this end, the computerized system 700 may also incorporate waive or sound processor or a similar device (not shown).

In one or more embodiments, the computerized system 700 may incorporate one or more input devices, such as a mouse/pointing device 710, such as a mouse, a trackball, a touchpad, or cursor direction keys for communicating direction information and command selections to the processor 701, for controlling cursor movement on the display 709 and for placing the cursor within the video canvas as described above. This input device typically has two degrees of freedom in two axes, a first axis (e.g., x) and a second axis (e.g., y), that allows the device to specify positions in a plane.

The computerized system 700 may further incorporate the camera 711 for acquiring still images and video of various objects, including the videos described herein, as well as a keyboard 706, which all may be coupled to the data bus 704 for communicating information, including, without limitation, images and video, as well as user commands (including gestures) to the processor 701. Additionally provided may be an audio recording device 703 for recording an audio track accompanying the video recorded by the camera 711.

In one or more embodiments, the computerized system 700 may additionally include a communication interface, such as a network interface 705 coupled to the data bus 704. The network interface 705 may be configured to establish a connection between the computerized system 700 and the Internet 724 using at least one of a WIFI interface 707, a cellular network (GSM or CDMA) adaptor 708 and/or local area network (LAN) adaptor 726. The network interface 705 may be configured to enable a two-way data communication between the computerized system 700 and the Internet 724. The WIFI adaptor 707 may operate in compliance with 802.11a, 802.11b, 802.11g and/or 802.11n protocols as well as Bluetooth protocol well known to persons of ordinary skill in the art. The LAN adaptor 726 of the computerized system 700 may be implemented, for example, using an integrated services digital network (ISDN) card or a modem to provide a data communication connection to a corresponding type of telephone line, which is interfaced with the Internet 724 using Internet service provider's hardware (not shown). As another example, the LAN adaptor 726 may be a local area network interface card (LAN NIC) to provide a data communication connection to a compatible LAN and the Internet 724. In an exemplary implementation, the WIFI adaptor 707, the cellular network (GSM or CDMA) adaptor 708 and/or the LAN adaptor 726 send and receive electrical or electromagnetic signals that carry digital data streams representing various types of information.

In one or more embodiments, the Internet 724 typically provides data communication through one or more sub-networks to other network resources. Thus, the computerized system 700 is capable of accessing a variety of network resources located anywhere on the Internet 724, such as remote media servers, web servers, other content servers as well as other network data storage resources. In one or more embodiments, the computerized system 700 is configured to send and receive messages, media and other data, including application program code, through a variety of network(s) including the Internet 724 by means of the network interface 705. In the Internet example, when the computerized system 700 acts as a network client, it may request code or data for an application program executing on the computerized system 700. Similarly, it may send various data or computer code to other network resources.

In one or more embodiments, the functionality described herein is implemented by computerized system 700 in response to processor 701 executing one or more sequences of one or more instructions contained in the memory 712. Such instructions may be read into the memory 712 from another computer-readable medium. Execution of the sequences of instructions contained in the memory 712 causes the processor 701 to perform the various process steps described herein. In alternative embodiments, hard-wired circuitry may be used in place of or in combination with software instructions to implement the embodiments of the invention. Thus, the described embodiments of the invention are not limited to any specific combination of hardware circuitry and/or software.

The term "computer-readable medium" as used herein refers to any medium that participates in providing instructions to the processor 701 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASHEPROM, a flash drive, a memory card, any other memory chip or cartridge, or any other medium from which a computer can read. Various forms of computer readable media may be involved in carrying one or more sequences of one or more instructions to the processor 701 for execution. For example, the instructions may initially be carried on a magnetic disk from a remote computer. Alternatively, a remote computer can load the instructions into its dynamic memory and send the instructions over the Internet 724. Specifically, the computer instructions may be downloaded into the memory 712 of the computerized system 700 from the foresaid remote computer via the Internet 724 using a variety of network data communication protocols well known in the art.

In one or more embodiments, the memory 712 of the computerized system 700 may store any of the following software programs, applications or modules:

1. Operating system (OS) 713 for implementing basic system services and managing various hardware components of the computerized system 700.
Exemplary embodiments of the operating system 713 are well known to persons of skill in the art, and may include any now known or later developed mobile operating systems.

2. Applications 714 may include, for example, a set of software applications executed by the processor 701 of the computerized system 700, which cause the computerized system 700 to perform certain predetermined functions, such as display user interface(s) on the display device 709 or record a video using the camera 711. In one or more embodiments, the applications 714 may include a video capture application 715 for capturing the video using the camera 711 and optionally the audio recording device 703 as well as a video editing application 716, described in detail below.

3. Data storage 721 may include, for example, a video storage 722 for storing videos as well as video edit data storage 723 for storing the information on the edits made by the user to the videos in the manner described above. In one or more embodiments, the video edit data storage 723 may store information on the new content added by the user to the video as well as the corresponding content insertion times.

In one or more embodiments, the inventive video editing application 716 incorporates a user interface generation module 717 configured to generate a user interface for enabling the user to edit videos in the manner described herein. The user interface is generated on the display 709 of the computerized system 700. The inventive video editing application 716 may further include a video processing module 718 for detecting content components in the frames of the video, such as alphanumeric characters or freedom ink strokes using content segmentation techniques well known to persons of ordinary skill in the art. In addition, the video editing application 716 may incorporate a video editing module 719 for direct video manipulation enabling the user to edit the original video content, including, without limitation, text, freedom ink strokes and images. Finally, the video editing application 716 may additionally include a video playback module 720 for playing the final video incorporating the user's edits as illustrated, for example, in FIG. 4.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, CIC++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for direct video retouching for text, strokes and images. It is intended that the specification and examples be considered as exemplary only, with a true scope and spirit of the invention being indicated by the following claims.

The invention claimed is:

1. A computer-implemented method performed in connection with a video comprising a plurality of video frames, the computer-implemented method being performed in a computerized system comprising a processing unit and a memory, the computer-implemented method comprising:
   a. using the processing unit to identify a plurality of connected content components within at least one of the plurality of video frames;
   b. based on a video modification instruction received from a user while video is playing, modifying a content of a selection of at least one of the plurality of connected content components, wherein the video modification instruction comprising the selection of at least one of the plurality of connected content components from within the at least one of the plurality of video frames, wherein the video is at least visually paused upon selection of the at least one of the plurality of connected content components by the user;
   c. storing an information on the modified at least one of the plurality of the identified connected content components in the memory;

d. using the central processing unit to overlay the modified at least one of the plurality of the identified connected content components over the video; and
e. causing the video with the overlaid modified connected content component to be displayed to the user.

2. The computer-implemented method of claim 1, wherein modifying at least one of the plurality of the identified content components comprises adding a content to the at least one of the plurality of the identified content components.

3. The computer-implemented method of claim 2, further comprising automatically determining a style of the at least one of the plurality of the identified content components and matching a style of the added content to the determined style.

4. The computer-implemented method of claim 2, wherein the information on the modified at least one of the plurality of the identified content components comprises the added content and a corresponding content insertion time.

5. The computer-implemented method of claim 1, wherein the modified at least one of the plurality of the identified content components comprises a line of textual content.

6. The computer-implemented method of claim 1, wherein the modified at least one of the plurality of the identified content components comprises an ink stroke.

7. The computer-implemented method of claim 1, wherein the modified at least one of the plurality of the identified content components comprises an image.

8. The computer-implemented method of claim 1, further comprising determining whether the at least one of the plurality of the identified content components changes in the video.

9. The computer-implemented method of claim 8, further comprising propagating the modification of the at least one of the plurality of the identified content components to all the video frames within the video if it is determined that the at least one of the plurality of the identified content components does not change in the video.

10. The computer-implemented method of claim 8, further comprising propagating the modification of the at least one of the plurality of the identified content components to other video frames within the video until the at least one of the plurality of the identified content components changes in the video.

11. The computer-implemented method of claim 8, further comprising generating a warning message to the user if it is determined that the at least one of the plurality of the identified content components changes in the video.

12. The computer-implemented method of claim 8, further comprising merging the modification of the at least one of the plurality of the identified content components with the changed at least one of the plurality of the identified content components.

13. The computer-implemented method of claim 1, further comprising marking each of the plurality of the identified content components within the video with corresponding bounding boxes.

14. The computer-implemented method of claim 1, further comprising pausing the video upon receipt of the video modification instruction from the user.

15. The computer-implemented method of claim 1, wherein the information on the modified at least one of the plurality of the identified content components is stored in a video edit layer associated with the video.

16. The computer-implemented method of claim 1, wherein the modified content component is displayed to the user based on a temporal nature of the video.

17. The computer-implemented method of claim 1, further comprising enabling the user to copy portions of the plurality of the identified content components and paste the copies portions to create the modified content component.

18. The computer-implemented method of claim 1, further comprising generating an overview image of the video, the overview image indicating to the user portions of the video where the modification can be made without an interference with any of the plurality of content components within the video.

19. The computer-implemented method of claim 1, further comprising detecting a horizontal shift of the content component within the video by performing an image difference operation on the content component in at least two different video frames.

20. The computer-implemented method of claim 1, further comprising detecting a vertical shift of the video frame by performing an image difference operation on at least two different video frames.

21. The computer-implemented method of claim 1, wherein the video modification instruction comprises a selection of one of the plurality of content components by the user.

22. The computer-implemented method of claim 1, further comprising preventing the user from making the modification to the content component if it is determined that the modification to the content component would interfere with another content component of a different video frame of the plurality of video frames.

23. A non-transitory computer-readable medium embodying a set of computer-executable instructions, which, when executed in connection with a video comprising a plurality of video frames in a computerized system comprising a processing unit and a memory, causes the computerized system to perform a method comprising:
a. using the processing unit to identify a plurality of connected content components within at least one of the plurality of video frames;
b. based on a video modification instruction received from a user while the video is playing, modifying a content of the selected at least one of the plurality of the connected content components, wherein the video modification instruction comprising a selection of at least one of the plurality of connected content components from within the at least one of the plurality of video frames, wherein the video is at least visually paused upon selection of the at least one of the plurality of connected content components by the user;
c. storing an information on the modified at least one of the plurality of the identified connected content components in the memory;
d. using the central processing unit to overlay the modified at least one of the plurality of the identified connected content components over the video; and
e. causing the video with the overlaid modified connected content component to be displayed to the user.

24. A computerized system comprising a processing unit and a memory storing a set of instructions, the set of instructions comprising instructions for:
a. using the processing unit to identify a plurality of connected content components within at least one of a plurality of video frames of a video;
b. based on a video modification instruction received from a user while video is playing, modifying a content of the selected at least one of the plurality of the connected content components, wherein the video modification instruction comprising a selection of at least one of the plurality of connected content components from within the at least one of the plurality of video frames, wherein the video is at least visually paused upon selection of the at least one of the plurality of connected content components by the user;

c. storing an information on the modified at least one of the plurality of the identified connected content components in the memory;

d. using the central processing unit to overlay the modified at least one of the plurality of the identified connected content components over the video; and e. causing the video with the overlaid modified connected content component to be displayed to the user.

25. The computer-implemented method of claim 1, wherein the selected at least one of the plurality of connected content components comprises at least one of alphanumeric characters and freedom ink strokes.

\* \* \* \* \*